United States Patent [19]

Jang

[11] Patent Number: 6,101,384
[45] Date of Patent: Aug. 8, 2000

[54] METHOD FOR AUTOMATICALLY CHANGING SERVICE AREA OF WIDE AREA PAGER IN SECOND GENERATION DIGITAL CORDLESS TELEPHONE

[75] Inventor: Jae-Young Jang, Suwon, Rep. of Korea

[73] Assignee: Samsung Electronics Co., Ltd., Rep. of Korea

[21] Appl. No.: 09/141,072

[22] Filed: Aug. 27, 1998

[30] Foreign Application Priority Data

Aug. 28, 1997 [KR] Rep. of Korea ................. 97/41869

[51] Int. Cl.[7] ................. H04Q 7/20; H04B 7/00
[52] U.S. Cl. ................. 455/426; 455/31.1; 455/31.2; 455/432
[58] Field of Search ................. 455/426, 31.1, 455/31.2, 31.3, 38.1, 432, 460, 465, 433, 435, 434, 90, 32.1; 340/825.44

[56] References Cited

U.S. PATENT DOCUMENTS

| | | |
|---|---|---|
| H160 | 11/1986 | Focarile et al. ................. 455/426 |
| 5,090,051 | 2/1992 | Muppidi et al. ................. 455/460 |
| 5,541,976 | 7/1996 | Ghisler ................. 455/426 |
| 5,574,771 | 11/1996 | Driessen et al. ................. 455/426 |
| 5,673,308 | 9/1997 | Akhavan ................. 455/426 |
| 5,684,859 | 11/1997 | Chanroo et al. ................. 455/31.3 |
| 5,701,337 | 12/1997 | Silver et al. ................. 455/426 |
| 5,839,054 | 11/1998 | Wright et al. ................. 455/31.2 |
| 5,862,484 | 1/1999 | Lee ................. 455/31.2 |

Primary Examiner—Dwayne D. Bost
Assistant Examiner—Quochien B. Vuong
Attorney, Agent, or Firm—Dilworth & Barrese

[57] ABSTRACT

A method for automatically changing a service area of a wide area pager integrated with a Second Generation Digital Cordless Telephone (CT-2) is provided. The method includes the step of receiving service area information by the CT-2 and transmitting the service area information to the wide area pager, when a radio paging mode is performed. The service area information transmitted to the wide area pager from the CT-2 is compared with preset service area information in the wide area pager. The preset service area information in the wide area pager is then changed to the service area information transmitted to the wide area pager, when the preset service area information is not identical to the transmitted service area information.

9 Claims, 2 Drawing Sheets

METHOD FOR AUTOMATICALLY CHANGING SERVICE AREA OF WIDE AREA PAGER IN SECOND GENERATION DIGITAL CORDLESS TELEPHONE

BACKGROUND OF THE INVENTION

1. Field of the Invention

The present invention relates to wide area paging systems and, more particularly, to a method for automatically changing a service area of a wide area pager integrated with a Second Generation Digital Cordless Telephone (CT-2).

2. Description of the Related Art

In utilizing a pager exclusively for reception and a second generation digital cordless telephone (CT-2) exclusively for transmission, the pager serves only to receive a signal(s) and the CT-2 serves only to transmit a signal(s). Accordingly, a need for complementing the functions of these two communication devices results in a complex terminal which combines the pager and the CT-2.

In the case of a wide area pager located beyond its subscription area, a subscriber (user) may still obtain paging service at any location within the country where a wide area paging system transmitter has been installed. However, for the user to receive paging service from the wide area paging system in such circumstances, a reference channel frequency should be set to the service channel frequency of the area where the user is currently located. Further, the wide area paging system should be informed of the service area change. Conventionally, this requires the user to inconveniently make a phone call to inform the wide area paging system of the change.

In Korea, the paging service area of a wide area pager is currently divided into the nine following service areas: Seoul (Kyungki-Do province); Pusan city (Kyungsangnam-Do province); Kyungsangpuk-Do province; Chungcheongnam-Do province; Chungcheongpuk-Do province; Chollanam-Do province; Chollapuk-Do province; Cheju-Do province; and Kangwon-Do province. In many of these service areas, the radio paging signals overlap. Thus, when a pager scans paging service areas in the Osan area of the Kyungki-Do province, the likelihood of the pager selecting the Chungcheongnam-Do province is about 40%. Moreover, a user carrying a pager having a service area of Chungcheongnam-Do province may obtain radio paging service even in the Suwon area of the Kyungki-Do province without changing his or her service area. In general, when a user is in an area where there is overlapping radio paging signals from different service areas, the service area of the user is not changed until the user is out of the area having overlapping signals. However, when a user moves from one service area to another service area, the service area of the user may change without consideration of the area having overlapping signals thereby resulting in errors with respect to the reception of radio paging signals.

SUMMARY OF THE INVENTION

It is an object of the present invention to provide a method for automatically changing a service area of a wide area pager by scanning the service area using a Second Generation Digital Cordless Telephone (CT-2) CT-2 which is integrated with the wide area pager.

It is another object of the present invention to provide a method for automatically changing a service area of a wide area paging system using a CT-2 which is integrated with a wide area pager.

To achieve the above and other objects, a method for automatically changing a service area of a wide area pager integrated with a Second Generation Digital Cordless Telephone (CT-2) is provided. The method includes the steps of: receiving service area information by the CT-2 and transmitting the service area information to the wide area pager, when a radio paging mode is performed; comparing the service area information transmitted to the wide area pager from the CT-2 with preset service area information in the wide area pager; and changing the preset service area information in the wide area pager to the service area information transmitted to the wide area pager, when the preset service area information is not identical to the transmitted service area information.

These and other objects, features and advantages of the present invention will become apparent from the following detailed description of illustrative embodiments thereof, which is to be read in connection with the accompanying drawings, where the same reference numerals are used to represent the same functional elements.

DETAILED DESCRIPTION OF PREFERRED EMBODIMENTS

Figure 1:
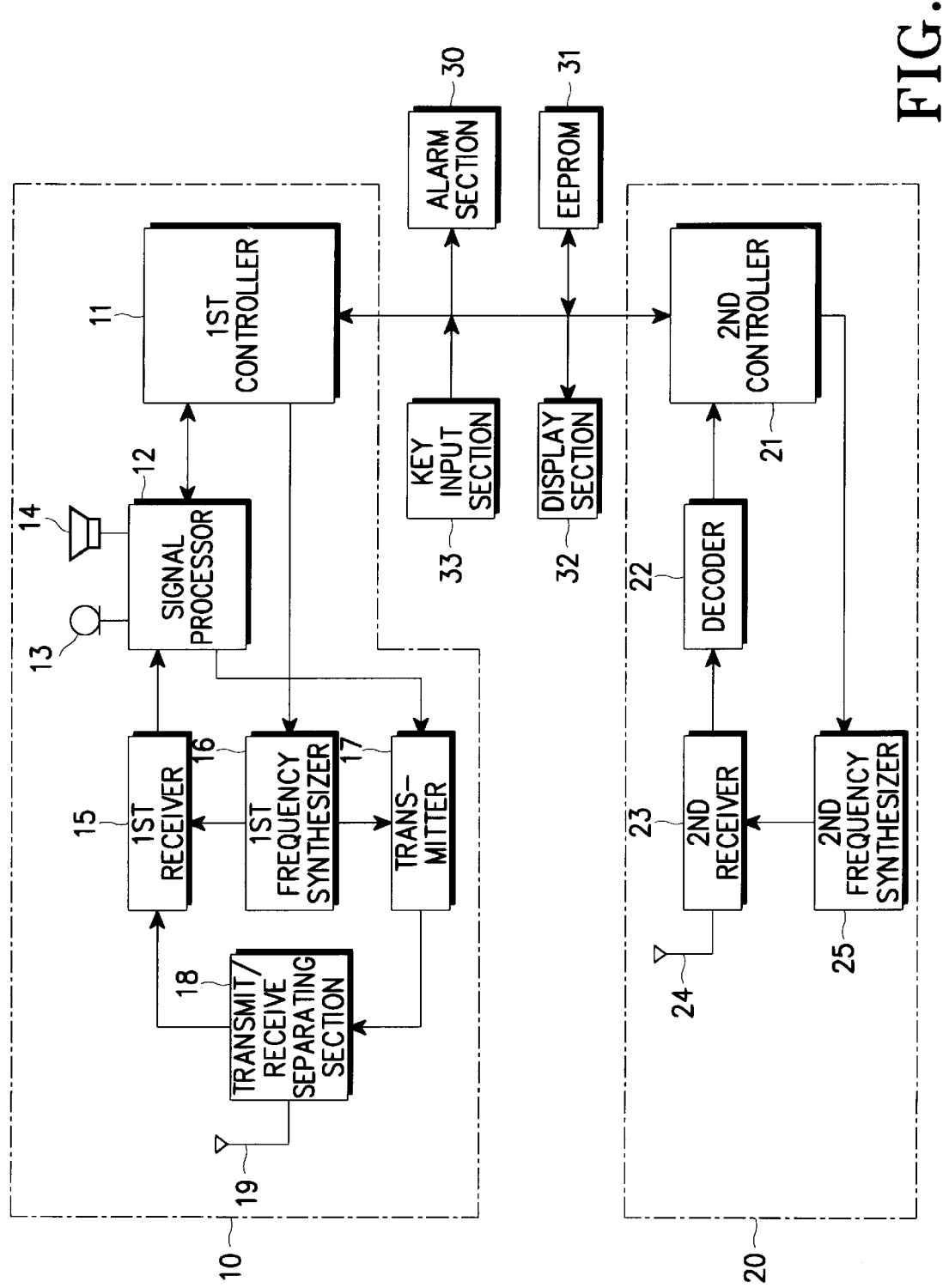
FIG. 1 is a block diagram of a second generation digital cordless telephone (CT-2) integrated with a wide area pager according to a preferred embodiment of the present invention.

Referring to FIG. 1, a block diagram is shown of a second generation digital cordless telephone (CT-2) integrated with a wide area pager according to a preferred embodiment of the present invention. The CT-2 10 includes a first frequency synthesizer 16 operatively coupled to a first receiver 15, a transmitter 17, and a first controller 11. A transmit/receive separating section 18 is operatively coupled to first receiver 15, transmitter 17, and an antenna 19. A signal processor 12 is operatively coupled to first receiver 15, transmitter 17, first controller 11, a microphone 13, and a speaker 14.

The first controller 11 controls the overall operation of CT-2 10. In particular, first controller 11 is a central processing unit (CPU) which includes a Read Only Memory (ROM) (not shown) for storing the execution program of CT-2 10 and a Random Access Memory (RAM) (not shown) for temporarily storing data produced during the execution of the execution program.

The first frequency synthesizer 16, under the control of first controller 11, generates a frequency for setting transmit and receive channels of transmitter 17 and first receiver 15, respectively. The transmit/receive separating section 18 separates radio signals to be transmitted or which have been received, and sends the separated radio signals to antenna 19 and first receiver 15, respectively. The first receiver 15 filters, low noise-amplifies and converts in frequency the separated radio signals from transmit/receive separating section 18 to apply the converted signals to signal processor 12. Transmitter 17 converts in frequency a signal from signal processor 12, amplifies the converted radio signal, and applies the radio signal to transmit/receive separating section 18.

The signal processor 12, under the control of first controller 11, converts the digital signal output from first receiver 15 into an analog aural signal which, in turn, is output to speaker 14. Additionally, signal processor 12 converts an analog aural signal from microphone 13 into a digital signal which, in turn, is applied to transmitter 17.

The wide area pager 20 includes a second receiver 23 operatively coupled to an antenna 24, a second frequency synthesizer 25, and a decoder 22. A second controller 21 is operatively coupled to decoder 22 and second frequency synthesizer 25. The second controller 21 controls the overall operation of wide area pager 20. In particular, second controller 21 is a central processing unit (CPU) which includes a ROM (not shown) for storing the execution program of a wide area pager and a RAM (not shown) for temporarily storing data produced during the execution of the execution program. The second controller 21 is operatively connected to first controller 11 via a communication line (e.g., RS-232C) in order to exchange (transmit/receive) data therebetween.

The second receiver 23 amplifies a weak radio signal received through a preset channel from antenna 24, converts in frequency the amplified signal into an original signal band to demodulate the amplified signal and waveform-shapes the demodulated signal to digital data for application to decoder 22. The decoder 22 decodes digital coded data from second receiver 23 to apply the decoded data to second controller 21. The decoder 22 detects a preamble signal and a word sync in a POCSAG code form. The decoder also detects associated frame data for application to second controller 21. The second frequency synthesizer 25, under the control of second controller 21, controls second receiver 23 in order to set a service channel frequency which conforms to a service area.

Additionally, a key input section 33, an alarm section 30, a display section 32, and an Electrically Erasable and Programmable ROM (EEPROM) 31 are coupled in common to CT-2 10 and wide area pager 20. The display section 32 (e.g., a Liquid Crystal Display (LCD)) operates under the control of first controller 11 and displays various display data including icons representative of the state of CT-2 10 and wide area pager 20. The key input section 33 consists of a set of numeric keys used for key dialing and a plurality of function keys used for selecting various special functions. The key input section 33 provides key data to first controller 11 and second controller 21 via the external manipulation of the keys. The key input section 33 performs various operations through the combination of keys in order to accomplish the functions of wide area pager 20 and CT-2 10. The alarm section 30, under the control of first controller 11 and second controller 21, consists of an alarm for making a sound and an oscillating motor for generating vibration. The EEPROM 31 is an electrically programmable non-volatile memory which stores data of CT-2 10 and wide area pager 20. In particular, EEPROM 31 stores a user radio paging number, a cap code, a reference channel frequency and a service channel frequency.

Figure 2:
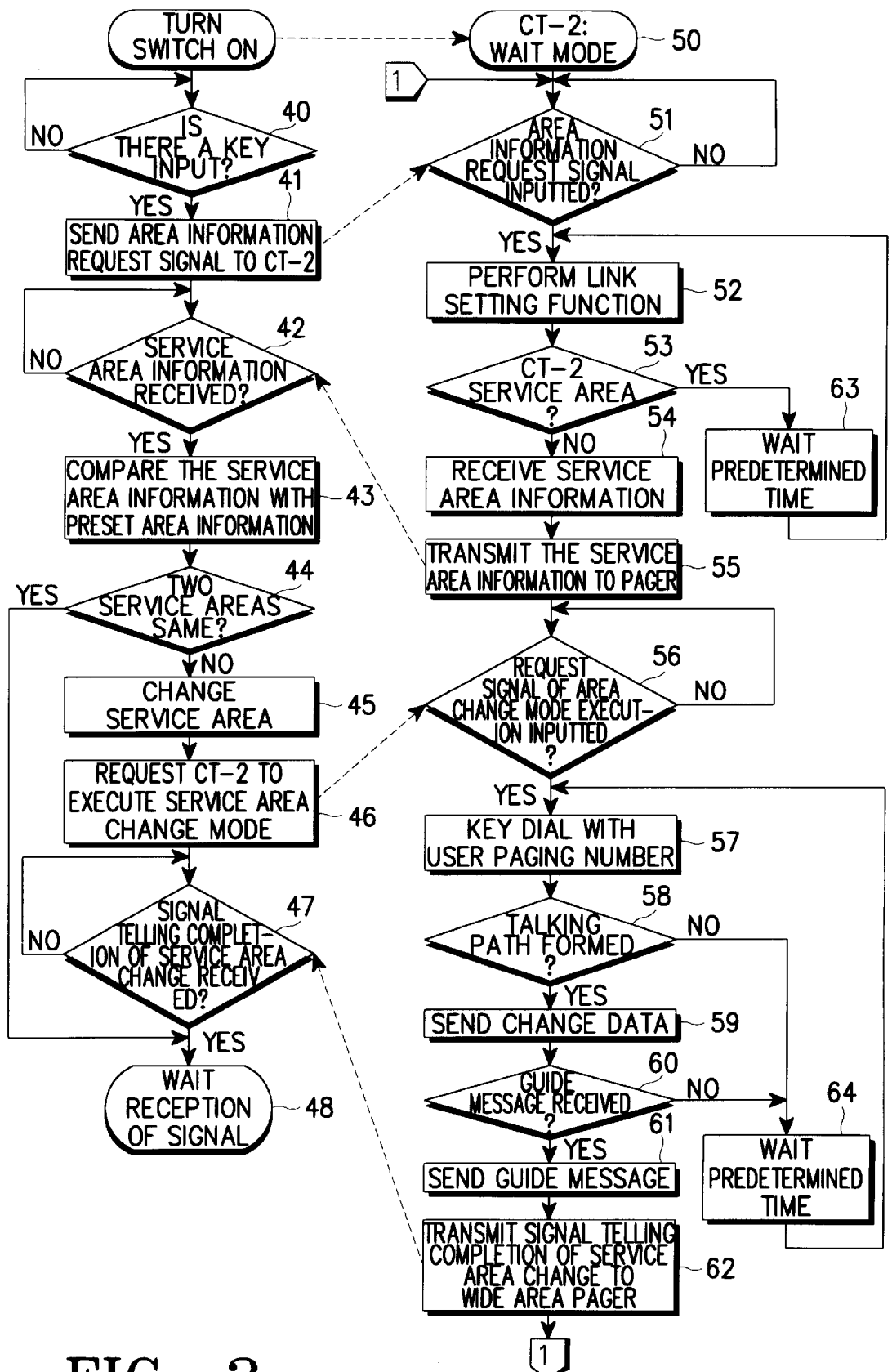
FIG. 2 is a flowchart of a method for automatically changing the service area of a CT-2 integrated with a wide area pager according to a preferred embodiment of the present invention.

FIG. 2 is a flowchart of a method for automatically changing the service area of a CT-2 integrated with a wide area pager according to a preferred embodiment of the present invention. Referring to FIGS. 1 and 2, the method includes a sub-process controlled by second controller 21 of wide area pager 20 (steps 40 through 48) and a sub-process controlled by first controller 11 of CT-2 10 (steps 50 through 64).

Initially, when a user applies power via a power supply switch, CT-2 10 enters a wait mode waiting for a next signal (step 50). The second controller 21 then senses whether or not a key input is provided for establishing a radio paging mode for the user to use the wide area pager (step 40). If the key input is sensed, then second controller 21 carries out the radio paging mode. Next, second controller 21 transmits a signal to CT-2 10 requesting area information (step 41).

The first controller 11 of CT-2 10 then determines whether or not the area information request signal is inputted (step 51). If so, then first controller 11 performs a link setting function with respect to a base station (step 52).

Subsequently, it is determined whether or not the service area where the link is set is a CT-2 service area (step 53). If so, then first controller 11 performs a call setting process in order to receive service area information (step 54). The call setting process conforms to a standard of CAI (Common Air Interface) protocol and employs FDMA/TDD (Frequency Division Multiple Access/Time Division Duplex) as known in the art. The first controller 11 then transmits the service area information to second controller 21 of wide area pager 20 (step 55).

Next, it is determined whether or not the service area information has been received from first controller 11 (step 42). If so, second controller 21 compares the received service area information with preset area information stored in EEPROM 31 (step 43), and determines whether or not the service area is identical to the preset area (step 44). If they are not identical, the program proceeds to step 45 and second controller 21 changes the service area to store the changed service area in EEPROM 31, and controls second receiver 23 through second frequency synthesizer 25.

The second controller 21 transmits a signal to first controller 11 requesting the execution of an area change mode (step 46). The area change mode is a mode for informing a radio paging system of a change in the service area through a key dialing operation.

Next, it is determined whether or not the signal requesting the execution of an area change mode is input to first controller 11 (step 56). If so, then first controller 11 reads a user radio paging number for key dialing from EEPROM 31 (step 57). It is then determined whether or not a talking path is formed between the radio paging system and CT-2 10 (step 58). If so, then first controller 11 transmits change data including service area information to be changed to second controller 21 (step 59).

Subsequently, it is determined whether or not a guide message indicating the service area change is received by first controller 11 from the radio paging system (step 60). If the guide message is received by first controller 11, then first controller 11 sends (broadcasts) the guide message via speaker 14. Then, first controller 11 transmits a signal indicating the completion of the service area change to second controller 21 (step 62).

Next, it is determined whether or not the signal indicating the completion of the service area change is received by second controller 21 (step 47). If so, then the program proceeds to step 48 and second controller 21 waits reception of a signal.

Meanwhile, if it is determined at step 44 that the service area is identical to the preset area, then second controller 21 proceeds to step 48. Also, if it is determined at step 53 that the service area corresponding to the set link is not a CT-2 service area, then the program proceeds to step 63 and first controller 11 waits a predetermined time and then, repeats step 52. Further, if it is determined at step 58 that a talking path is not formed, then the program proceeds to step 64 and first controller 11 waits a predetermined time and then, repeats step 57. Moreover, if it is detected at step 60 that the guide message is not received, then the program proceeds to step 64 and first controller 11 waits a predetermined time and then, repeats step 57.

As described above, the present invention allows the service area of a wide area pager to be changed by scanning the service area using a CT-2 integrated with the wide area pager. In addition, the integration of the wide area pager and the CT-2 according to the present invention allows the service area to be automatically changed.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for automatically changing a service area of a wide area pager integrated with a Second Generation Digital Cordless Telephone (CT-2), comprising the steps of:

receiving service area information by the CT-2 and transmitting the service area information to the wide area pager, when a radio paging mode is performed;

comparing the service area information transmitted to the wide area pager from the CT-2 with preset service area information in the wide area pager; and changing the preset service area information in the wide area pager to the service area information transmitted to the wide area pager, when the preset service area information is not identical to the transmitted service area information.

2. The method of claim 1, further comprising the step of automatically changing the service area of a radio paging system using the CT-2.

3. The method of claim 2, wherein the step of automatically changing the service area of the radio paging system farther comprises the steps of;

key-dialing a user wide area pager number by the CT-2;

transmitting change data for changing the service area to the radio paging system, when a talking path is formed between the radio paging system and the CT-2; and changing the service area of the radio paging system.

4. A method for automatically changing a service area of a wide area pager in a radio paging system, the wide area pager having a radio paging number stored therein and being integrated with a Second Generation Digital Cordless Telephone (CT-2), comprising the steps of:

transmitting a signal for requesting a change of the service area from the wide area pager to the CT-2;

key-dialing the user radio paging number by the CT-2; and transmitting change data for changing the service area to the radio paging system, when a talking path is formed between the radio paging system and the CT-2.

5. A method for automatically changing a service area of a wide area pager in a radio paging system, the wide area pager having a radio paging number stored therein and being integrated with a Second Generation Digital Cordless Telephone (CT-2), comprising the steps of:

receiving service area information by the CT-2 and transmitting the service area information to the wide area pager, when a radio paging mode is performed;

comparing the service area information transmitted to the wide area pager from the CT-2 with preset service area information in the wide area pager;

changing the preset service area information in the wide area pager to the service area information transmitted to the wide area pager, when the preset service area information is not identical to the transmitted service area information;

transmitting a signal for requesting a change of the service area from the wide area pager to the CT-2;

key-dialing the user radio paging number by the CT-2; and transmitting change data for changing the service area to the radio paging system, when a talking path is formed between the radio paging system and the CT-2.

6. The method of claim 5, wherein the service area information received by the CT-2 corresponds to the service area where a link is set to the CT-2.

7. The method of claim 5, wherein the preset service area information in the wide area pager is stored in an EEPROM.

8. The method of claim 5, wherein the user radio paging number is stored in an EEPROM.

9. The method of claim 5, further comprising the step of transmitting a signal indicating a completion of the change of the service area of the radio paging system to the wide area pager.

* * * * *